United States Patent
Granbery et al.

(10) Patent No.: US 11,062,295 B2
(45) Date of Patent: *Jul. 13, 2021

(54) TRANSACTIONS ASSOCIATED WITH A MOBILE DEVICE

(71) Applicant: PAYPAL, INC., San Jose, CA (US)

(72) Inventors: J. Hastings Granbery, Boston, MA (US); Max Metral, Brookline, MA (US)

(73) Assignee: PAYPAL, INC., San Jose, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 16/100,162

(22) Filed: Aug. 9, 2018

(65) Prior Publication Data

US 2019/0080310 A1  Mar. 14, 2019

Related U.S. Application Data

(63) Continuation of application No. 13/360,941, filed on Jan. 30, 2012, now Pat. No. 10,074,086, which is a
(Continued)

(51) Int. Cl.
*G06Q 20/32* (2012.01)
*G06Q 20/20* (2012.01)
(Continued)

(52) U.S. Cl.
CPC ............ *G06Q 20/32* (2013.01); *G06Q 20/10* (2013.01); *G06Q 20/20* (2013.01); *G06Q 20/327* (2013.01);
(Continued)

(58) Field of Classification Search
CPC ........ G06Q 20/32; G06Q 20/10; G06Q 20/20; G06Q 20/327; G06Q 20/40; G06Q 30/06; G06Q 30/0601
(Continued)

(56) References Cited

U.S. PATENT DOCUMENTS 7,254,560 B2 *  8/2007  Singhal .................. G06Q 20/02
                                                          705/64
7,349,871 B2 *  3/2008  Labrou .................. G06Q 20/02
                                                          705/26.35
(Continued)

FOREIGN PATENT DOCUMENTS

WO    WO 98/34203      8/1998
WO    WO 2009/152184   12/2009

OTHER PUBLICATIONS

U.S. Appl. No. 13/360,941, Final Office Action dated May 24, 2012, 8 pages.
(Continued)

*Primary Examiner* — Garcia Ade
(74) *Attorney, Agent, or Firm* — Haynes and Boone, LLP

(57) ABSTRACT

Methods and apparatus, including computer program products, for transactions associated with a mobile device are discussed. A method can include receiving a merchant identifier, sending an identification data, receiving a transaction, and processing a funds transfer. The receiving the merchant identifier is from a mobile device associated with a user registered with a central payment service. The identification data is associated with the user and the identification data includes multiple identifying data items. The transaction data details a transaction between the merchant and the user. The funds transfer is between the merchant and the user based on the transaction.

20 Claims, 4 Drawing Sheets

Related U.S. Application Data continuation of application No. 12/925,619, filed on Oct. 26, 2010, now Pat. No. 8,645,213.

(60) Provisional application No. 61/295,490, filed on Jan. 15, 2010.

(51) Int. Cl.
*G06Q 20/10* (2012.01)
*G06Q 20/40* (2012.01)
*G06Q 30/06* (2012.01)

(52) U.S. Cl.
CPC ............ *G06Q 20/40* (2013.01); *G06Q 30/06* (2013.01); *G06Q 30/0601* (2013.01)

(58) Field of Classification Search
USPC .......................................... 705/16
See application file for complete search history.

(56) References Cited

U.S. PATENT DOCUMENTS

| | | |
|---|---|---|
| 7,483,858 B2 | 1/2009 | Foran et al. |
| 8,645,213 B2 | 2/2014 | Granbery et al. |
| 2002/0065774 A1* | 5/2002 | Young ................ G06Q 20/327 705/41 |
| 2008/0208739 A1* | 8/2008 | Phillips ................ G06Q 20/20 705/40 |
| 2010/0063889 A1* | 3/2010 | Proctor, Jr. ........ G06Q 20/4016 705/21 |
| 2011/0082735 A1* | 4/2011 | Kannan ............. G06Q 30/0222 705/14.23 |
| 2012/0130895 A1 | 5/2012 | Granbery et al. |

OTHER PUBLICATIONS

U.S. Appl. No. 12/925,619, Appeal Brief filed Jun. 6, 2013, 17 pages.
U.S. Appl. No. 12/925,619, Notice of Allowance dated Sep. 27, 2013, 11 pages.
U.S. Appl. No. 12/925,619, Final Office Action dated Dec. 6, 2012, 9 pages.
U.S. Appl. No. 12/925,619, Non Final Office Action dated May 24, 2012, 9 pages.
U.S. Appl. No. 12/925,619, Response filed Aug. 24, 2012 to Non Final Office Action dated May 24, 2012, 11 pages.

* cited by examiner

TRANSACTIONS ASSOCIATED WITH A MOBILE DEVICE

CROSS-REFERENCE TO RELATED APPLICATIONS

This continuation patent application claims priority to and the benefit of U.S. patent application Ser. No. 13/360,941, filed Jan. 30, 2012, which is a continuation of and claims the benefit of U.S. patent application Ser. No. 12/925,619, filed Oct. 26, 2010, which granted Feb. 4, 2014 as U.S. Pat. No. 8,645,213, which claims the benefit of U.S. Provisional Application No. 61/295,490, filed Jan. 15, 2010, entitled A SYSTEM FOR RAPID PAYMENT USING A MOBILE DEVICE, which applications are hereby incorporated by reference in their entirety.

BACKGROUND OF THE INVENTION

The present invention relates to mobile devices and data processing by digital computer, and more particularly to transactions associated with a mobile device.

Advances in processor, memory, and wireless technologies have led to the proliferation of mobile electronic devices. Typical mobile devices, such as WiFi-enabled wireless mobile phones (e.g., WiFi-enabled smartphones) and personal digital assistants (WiFi-enabled PDAs) provide a wide array of services, such as cellular calling, email, text messaging, calendar and address book services, media object acquisition and playback services, and camera services, among many others. In acquiring media objects, cell phone minutes, or other goods or services available over the Internet, mobile devices often provide users with the same functionalities as other computing devices.

Concurrently, merchants such as retailers, wholesalers, and service providers offer customers a wide variety of payment methods. Customers can often pay via any of cash, check, money order, gift card, credit card, and debit card. The variety of payment methods, combined with the fact that many merchants do not accept certain types of credit cards, and so forth, requires customers to carry on their persons instruments associated with a large number of payment methods (e.g. credit cards, debit cards). Carrying this wide array of payment method instruments is often quite burdensome to many customers.

SUMMARY OF THE INVENTION

The present invention provides methods and apparatus, including computer program products, for transactions associated with a mobile device.

In general, in one aspect, the invention features a method including, in a merchant device linked to a server by a first network, sending a registration to the server, sending a transaction message to the server, receiving a unique identifier from the server in response to the transaction message, broadcasting the unique identifier, in response to the broadcasted unique identifier, receiving instructions in the server from a mobile application residing in a memory of a mobile device over a second network, processing a transaction in response to the instructions, and notifying the merchant device of the processed transaction.

In another aspect, the invention features a method including, in a mobile device having a mobile application residing in a memory, detecting a unique identifier broadcasted by a merchant device over a first network, sending a transaction message containing the unique identifier over a second network to a server, receiving a transaction summary from the server over the second network, and sending processing instructions to the server over the second network in response to the received transaction summary.

In yet another aspect, the invention features a method including, receiving a merchant identifier from a mobile device associated with a user registered with a central payment service; sending identification data associated with the user, the identification data including multiple identifying data items; receiving transaction data detailing a transaction between the merchant and the user; and processing a funds transfer between the merchant and the user based on the transaction.

Other features and advantages of the invention are apparent from the following description, and from the claims.

BRIEF DESCRIPTION OF THE DRAWINGS

The invention will be more fully understood by reference to the detailed description, in conjunction with the following figures, wherein.

Like reference numbers and designations in the various drawings indicate like elements.

DETAILED DESCRIPTION

Illustrative embodiments of the present invention include, but are not limited to, methods and apparatuses for a service provider capable of providing transactional services to a mobile device user for one or more transactions with a merchant providing goods and/or services.

Figure 1:
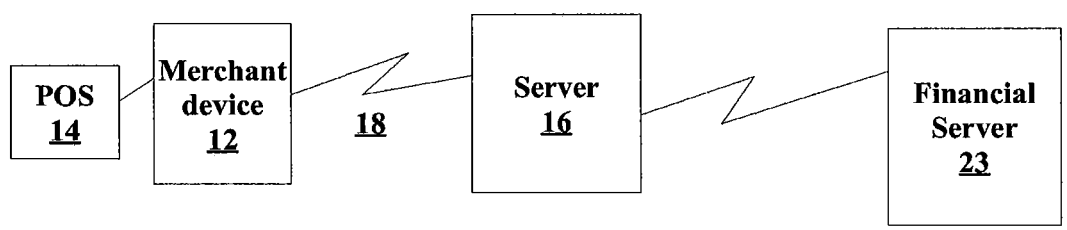
FIG. 1 is a block diagram.
Figure 1:
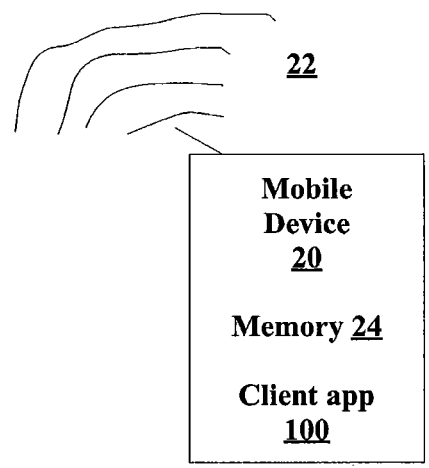

As shown in FIG. 1, a system 10 includes a merchant device 12 connected to merchant point of sale (POS) system 14. Although the exemplary system 10 shows the merchant device 12 linked to the merchant POS system 14, other implementations are possible. For example, in one implementation, the merchant device 12 can be linked to a merchant datacenter that processes all transactions. The merchant device 12 is linked to a server 16 by a network 18. The system 10 also includes a mobile device 20 linked by a network 22 to the server 16. The network 18 can be wired or wireless. The network 22 is a wireless network (e.g., IEEE 802.11, Bluetooth). The server 16 is linked to one or more financial servers 23. The financial servers 23 provide secured transactions, such as credit/debit card transactions, and information related to these financial transactions. In other implementations, secured transactions are performed internally by a merchant datacenter.

In general, a POS system, such as POS system 14, is a computerized replacement for a cash register. Much more complex than the cash registers of even just a few years ago, the POS system can include an ability to record and track customer orders, process credit and debit cards, connect to other systems in a network, and manage inventory. Generally, the POS system has as its core a personal computer, which is provided with application-specific programs and input/output (I/O) devices for the particular environment in which it will serve.

The merchant device 12 is a hardware device containing software that communicates transaction information over the network 18 from the merchant POS system 14 to the server 16. In one specific example, the merchant device 12 communicates transaction information over the network 18 in coordination with information transmitted by the POS system 14.

The mobile device 20 can be a personal digital assistant (PDA), enterprise digital assistant or mobile phone, such as an Apple® iPhone®, Blackberry® or Android™ phone. The mobile device 20 includes a client application 100 residing in a memory 24. In one specific example, the client application 100, also referred to as mobile application 100, is downloaded by a mobile device user from an app store or other mobile software distribution platform.

The merchant device 12 provides an indication to the mobile device 20 through the client application 100 that transactions with the merchant device 12 are available. The indication may include audio and/or video indication. More particularly, the merchant device 12 is represented by a unique identifier. In one example, the unique identifier is a 48-bit Media Access Control (MAC) address, with the first three octets of 48-bit MAC address referred to as an Organizationally Unique Identifier (OUI) assigned by the Institute of Electrical and Electronics Engineers (IEEE). In this example, the 48-bit number is used as a Basic Service Set Identifier (BSSID) for network 22. Transactions include the purchase of goods and/or services offered by a merchant having the merchant device 12.

Other merchant device configurations are possible, depending on the equipment available at the merchant site. In one example, the merchant device 12 includes a display screen, a wireless local area network (WLAN) device based on the IEEE 802.11 (e.g., WiFi), and a facility for internet connectivity. The merchant device 12 may connect to a POS terminal.

In another example, a display device is external to the merchant device 12. Internet connectivity can use an existing merchant internet connection or the merchant device 12 can have a "self-contained" Internet connection using a wide area network (WAN) such as General packet radio service (GPRS). In still another example, the merchant device 12 can connect to a personal computer and/or mobile phone that enables both a display and Internet access to the merchant device 12.

In another example, the merchant device 12 is a mobile phone such as an Apple® iPhone® or Android® phone that has the ability to transmit WiFi packets and connect to the internet by itself. In still another example, the merchant device 12 may not include a display device and simply interface to, or be included with, existing merchant payment systems, such as, for example, card swipe terminals or point of sale systems.

The mobile device 20 is capable of connecting to a WAN, typically the Internet, in order to contact the server 16. The mobile device 20 detects broadcasts by the merchant device 12. Typically, these broadcasts advertise an availability of networks using a technology such as IEEE 802.11 Wireless Networking or Bluetooth Wireless Networking. In a specific example, the mobile device 20 resides in an automobile having an advanced control system, such as the Ford® SYNC from Ford Motor Corporation, which provides WiFi, an ability to run applications designed by third parties and connection to the Internet.

As described above, the mobile device 20 includes the client application 100. Client application 100 is a process that executes in the mobile device 20, detects a presence of the merchant device 12 and communicates the detected merchant and additional information to the server 16. The client application 100 provides a visual interface to the user enabling the user to perform a variety of tasks, including reviewing transaction details, approving payment, correcting payment problems, and providing identification (such as a password or other biometric identification) to prove an identity of the user. In embodiments, the client application 100 performs a variety of other tasks, such as keeping electronic receipts of purchases made by the user from the merchant, enabling multiple parties to coordinate payment (e.g., ten of a party of twenty-three splitting a restaurant bill), and/or displaying special offers from the merchant or related merchants either before or after a payment transaction has occurred.

Figure 2:
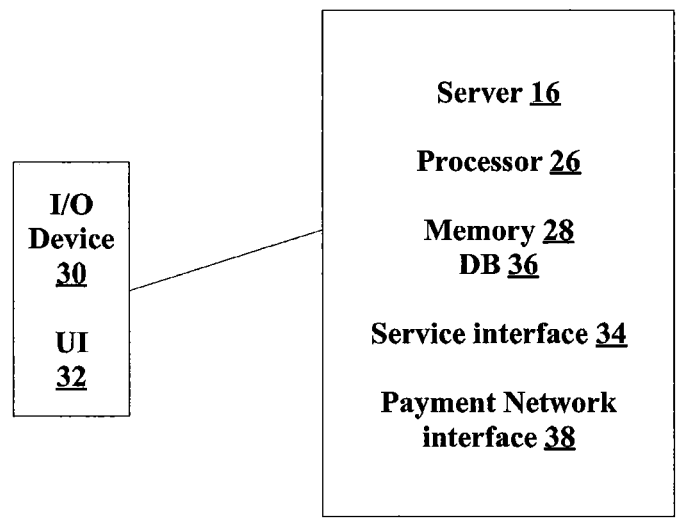
FIG. 2 is a block diagram.

As shown in FIG. 2, the server 16 is a computer or set of computers made available on networks 18, 22 to enable access by the merchant device 12 and the client application 100 residing in the mobile device 20. The server 16 can include a processor 26, memory 28, an input/output (I/O) device 30 displaying a user interface (UI) 32 and a service interface 34 for communicating with other entities in the networks 18, 22. The server 16 also includes a database 36 residing in the memory 28 or in an external storage device (not shown). The database 36 serves as a store of information, such as merchant information, customer information, transaction information, configuration information, historical information and so forth. The server 16 includes a payment network interface 38 for processing transactions with the financial server(s) 23.

Payments flow through the server 16 by communication with the client application 100 or the merchant device 12. Communication between the merchant device 12 and the server 16 takes place through the service interface 34. Communication between customers or merchants and the server 16 takes place through the UI 32.

The server 16 can provide significantly expanded configuration and setting information to the merchant, such as couponing, frequent user programs, and/or an ability to gather contact information from purchasers on an opt-in (i.e., voluntary) basis.

The merchant device 12 may interface directly with a variety of other devices resident or in proximity to the merchant's physical location. These other devices can include devices selected from the group including cash registers, credit/debit card terminals, point of sale systems, display terminals, receipt printers and networking equipment such as a router or hub.

Prior to enabling payments, a merchant establishes a network connection to the merchant device 12 and registers with the server 16. Registration information includes information necessary to process a payment transaction on his or her behalf. Once registration is complete, the server 16 associates the merchant device's unique identifier with merchant account information.

Prior to a customer's first transaction, the customer registers with the server 16. This registration can be implemented within the client application 100 or from any other device capable of accessing the server 16 over a network, such as a laptop/notebook computer or a personal computer (PC). During customer registration, the customer provides payment information suitable for making purchases. This information is stored by the server 16.

Information collected and stored in the records may be modest or extensive, depending upon the variety of transactions the registrant desires to engage in. Basic personal information, such as name, address, email address, and phone number may be collected, as well as information associated with the mobile device 20 to be associated with the registration, such as wireless service provider, wireless account number, communication features of the phone (email, SMS, and so forth), and a mobile device 20 phone number. In addition, payment methods that the registrant wishes to use, such as debit and credit card accounts, may be provided along with the relevant name(s) on the account, the account numbers, card expiration dates, and names of the financial institutions associated with the payment method accounts may also be collected. Further, information about service features associated with the mobile device 20, such as cellular minutes, text messages, and media object downloads may be collected and stored. Other information may also be collected and stored. Thus, the above recitation is in no way intended to fully set forth all collected and stored data.

Once the merchant device 12 is registered with the server 16, the merchant device 12 broadcasts its availability. Mobile devices who have registered with the server 16, such as mobile device 20, and are within range of the merchant device's broadcast, detect the broadcast. Broadcast detection is enabled by the client application 100. Detection of the broadcast enables the user of the mobile device 20 to conduct transactions through the server 16 with the merchant having the merchant device 12. Communication of the merchant device 12 with the server 16 is independent from communication of the mobile device 20 with the server 16.

Transactions can include purchasing goods and services offered by the merchant and/or payment of purchased goods and/or services of the merchant.

Interactions among the elements in system 10 are described more fully as follows. As described above, system 10 includes a physical device used by the merchant (i.e., merchant device 12), the client application 100 used by the customer on the mobile device 20, and the server 16 supporting both payment processing and communication between the client application 100 and the merchant device 12. A goal is to provide verifiable payment information such that a transaction can be completed quickly—typically as quickly as a normal credit card transaction using a modern electronic credit card reader system. At the time of an exemplary purchase, the following steps complete a transaction. Certain elements may occur in different order as there are essentially two independent actors—the merchant and the customer (user). For simplicity, an exemplary flow presented below illustrates the merchant acting first. In other instances, the user may begin before the merchant, waiting for the relevant action from the Merchant to complete a transaction.

By way of example, a customer may desire to pay for an item or service. The merchant starts by sending an amount and optionally other information, such as line item details, to the merchant device 12. The merchant device 12 sends a message to the server 16 that it is prepared to charge the particular amount. This message includes the merchant account information and device identifier, as well as other information provided to the merchant device 12 in the context of the transaction. For example, the message may include details of how the amount may be changed (e.g., additional tip amount). For another example, the message may contain line item details including products purchased, taxable amounts and/or other service charges.

The server 16 stores or caches the information sent by the merchant device 12 and returns an identifier, which may or may not be globally unique, merchant unique, or customer unique, to the merchant device 12. The merchant device 12 begins broadcasting its unique identifier (e.g. a BSSID over its WiFi) or an identifier derived from its unique identifier, using a technology such as IEEE 802. Wireless Networking or Bluetooth, that the mobile device 12 can detect; at approximately the same time, if a customer-facing screen is present, the signal may display an instruction to the customer to initiate the transaction, which may include a "reference number" to disambiguate simultaneous transactions at a merchant. The user launches (or is already running) the client application 100 and may optionally be required to provide validation credentials, such as a password or "identifying gesture," such as a finger swipe, fingerprint, or other biometric identification. The client application 100 detects relevant wireless networks (e.g., filtering the BSSID by a predetermined OUI prefix or by filtering based on the "name" or SSID 24 of the discovered networks).

The client application 100 sends a request to the server 16 asking for information about the current transaction being proffered by the merchant device 12 in range as represented by the unique identifier of the device. Should there be multiple candidate transactions in range of the same set of merchant devices, various disambiguation strategies may be used. For example, the customer may be asked to type in the amount of the transaction, or a sales register number, or any other piece of information which differentiates one merchant device from another. In another instance, a signal strength of the available merchant device may be used to triangulate position or simply choose the highest power merchant device.

The server 16 sends the client application 100 information about the purchase. The user views the information displayed by the client application 100, and if satisfied, that the correct amount is being charged or the products are as expected, and confirms the transaction. Confirmation may include a simple button press or require a signature or other identifying device (e.g., biometrics, fingerprints, and so forth).

As discussed supra, alterations to the order may be made, such as tip amount. Other alterations to the order or amount may proceed prior to the completion of the transaction. For example, the merchant or customer may desire to remove an item from the transaction and update the amount and/or line item details. Upon customer confirmation, the client application 100 sends a confirmation message to the Server 16. The Server 16 processes the customer's payment information, typically a credit card transaction. In one instance, the "merchant identifier," a number given out by the credit card processor to the merchant, may be used. In another instance, a merchant identifier held by the entity operating the overall system may be used to serve multiple merchants, like Paypal®, Google® Checkout and so forth. The server 16 informs the merchant device 12 that the transaction was successful, which then either displays this information to the merchant, or informs a Point of Sale system that the transaction was successful. The server 16 informs the client application that the transaction was successful.

Other embodiments are within the scope of the invention described above. Elements of the system 10 can be used outside the scope of a financial transaction. For example, if a customer sees a window sticker at a merchant location that advertises support of the system 10, the customer may start the client application 100 and be apprised of special offers available at the merchant. This includes client application 100 detecting relevant broadcast unique identifiers, sending them to the server 16, and getting special offers from the merchant or related merchants potentially customized to the individual and/or their previous buying habits with the merchant or other merchants.

In other embodiments, functionality in a restaurant, a menu may enable ordering directly on the mobile phone; at a gas station, a specialized interface for specifying fuel grade and maximum amount may be presented to the user. The system 10 can also be used to implement coupons or loyalty card programs. In concert with a financial transaction, a "virtual" loyalty card may receive value as a result of a transaction, and that value may be redeemed using the system 10 at that point or in the future.

In certain situations, such as group dining, multiple customers may desire to participate in a single transaction. If an active transaction exists for one or more customers and one or more additional customers wish to participate in payment (and if the merchant has enabled this transaction to be paid by multiple parties), the other customers can start the client application 100 on their respective mobile devices. The client applications detect the merchant device and request to enroll in the appropriate transaction. One or more customers having already completed a transaction may be prompted to approve the new paying party. The client applications of the existing customers and/or additional participating customers presents an interface enabling the respective parties to determine how the payment will be divided. After this has been determined, each customer can complete payment and the merchant device is notified of the outcome.

In another embodiment, the merchant device 12 broadcasts an availability of a network using the BSSID as the unique identifier of the merchant device 12. In a specific example, the merchant device 12 broadcasts more than one BSSID over the course of a transaction. In cooperation with the server 16, this enables the merchant device 12 to indicate certain information by manipulating a secondary BSSID. For example, the secondary BSSID can indicate a price of an available transaction. Using the secondary BSSID enables efficient communication of several key facts, for example, that the merchant device 12 in question is currently offering a transaction, and/or the price of that transaction obscured by a key that is only known to the merchant device 12 and the client application 100 (which prevents unrelated parties from snooping).

In one embodiment, an act of the client application 100 sending discovered unique identifiers to the server 16 enables the server 16 to present "candidate payers" to the merchant device 12 (e.g., presenting a photo of the person). This in turn enables a merchant operator to make sure they are charging the right person in a high-capacity checkout situation having cash registers in close physical proximity to one another.

In another embodiment, if the mobile device 20 cannot contact the server 16 on its own Internet connection, the merchant device may act as a "traditional" wireless access point (WAP) and offer to route information from the mobile device 20 to the server 16. Since communications between the mobile device 20 and server 16 accommodate third party "observers," this arrangement presents no security challenges; the identity and security mechanisms used to connect to the merchant device 12 may be dependent on which particular mobile device 20 is in use (for example, the username and password for the access point may be related to the user of the mobile device 20).

Figure 3:
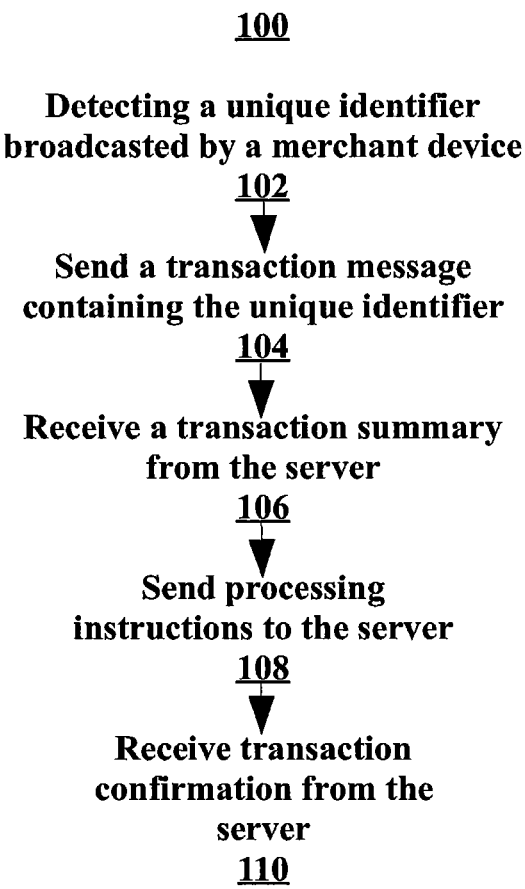
FIG. 3 is a flow diagram.

As shown in FIG. 3, the process 100 includes, in a mobile device having a mobile application residing in a memory, detecting (102) a unique identifier broadcasted by a merchant device over a first network. The mobile device can be a WiFi-enabled wireless mobile phone, WiFi-enabled personal data assistant (PDA) or mobile device residing in an automobile having advanced control system. The unique identifier can be a Media Access Control (MAC) address of the merchant device.

Process 100 sends (104) a transaction message containing the unique identifier over a second network to a server. The server can be linked to a financial processing server over a third network. The financial processing server can be a credit card/debit card transaction server.

Process 100 receives (106) a transaction summary from the server over the second network. The transaction summary can include transaction details for the purchase or sale of goods or services, including price.

Process 100 sends (108) processing instructions to the server over the second network in response to the received transaction summary.

Process 100 receives (110) transaction confirmation from the server.

Figure 4:
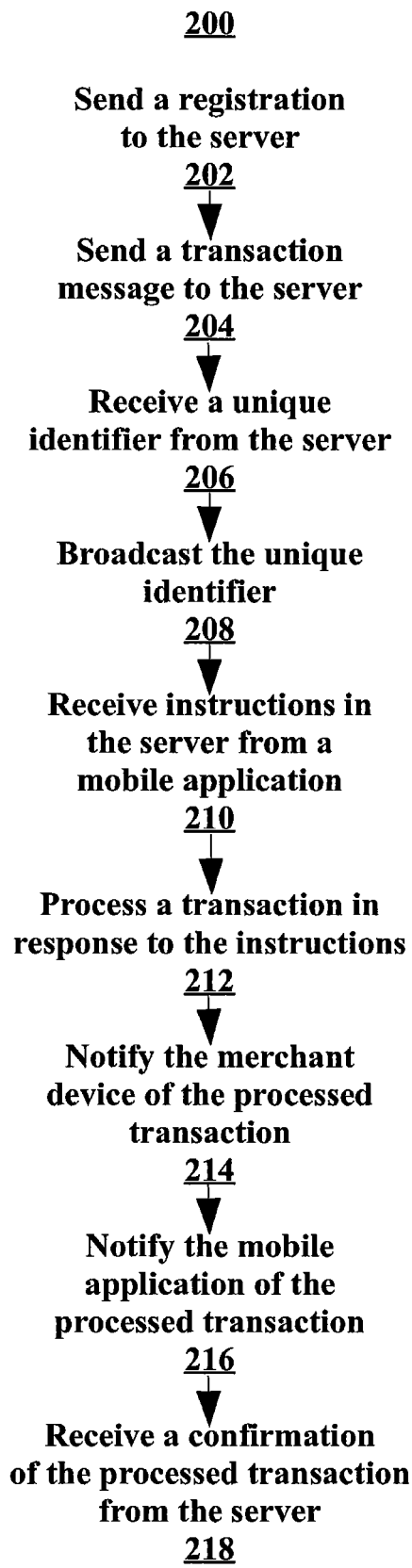
FIG. 4 is a flow diagram.

As shown in FIG. 4, a merchant device process 200 includes, in a merchant device linked to a server by a first network, sending (202) a registration to the server. The registration may include information related to the merchant device. The merchant device can be linked to a point of sale (POS) system.

The server can be linked to a financial processing server over a third network. The financial processing server can be a credit card/debit card transaction server.

Process 200 sends (204) a transaction message to the server. The transaction message can include transaction details for the purchase or sale of goods or services, including price.

Process 200 receives (206) a unique identifier from the server in response to the transaction message. The unique identifier can be a Media Access Control (MAC) address of the merchant device.

Process 200 broadcasts (208) the unique identifier.

Process 200, in response to the broadcasted unique identifier, receives (210) instructions in the server from a mobile application residing in a memory of a mobile device over a second network. The second network can be a wireless network. The instructions can be payment instructions.

The mobile device can be a WiFi-enabled wireless mobile phone, WiFi-enabled personal data assistant (PDA), or a mobile device residing in an automobile having an advanced control system.

Process 200 processes (212) a transaction in response to the instructions. The transaction may be processed by the server. The transaction may be processed by the merchant device in response to receiving the instructions from the server.

Process 200 notifies (214) the merchant device of the processed transaction.

Process 200 notifies (216) the mobile application of the processed transaction.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

The invention claimed is:

1. A system, comprising:
one or more processors, one or more computer-readable memories, with program instructions stored on the one or more computer-readable memories, the one or more processors configured to execute the program instructions to cause the system to perform operations comprising:
transmitting, to a payment server, a request to register for a first account;
receiving, from the payment server, a first unique identifier, wherein the first unique identifier is generated by the payment server and corresponds to the system;
in response to the receiving, altering the first unique identifier based on a transaction entered to the system;
broadcasting a message to one or more devices that are located within a threshold distance of the system, wherein the message includes the altered first unique identifier;
determining, via the payment server, that at least one of the one or more devices received the broadcasted message;
providing, through the at least one of the one or more devices, at least one of an audio indication or a video indication that transactions are available to be processed with the system;
receiving, from the payment server, information corresponding to a first device of the one or more devices, wherein the information includes the altered first unique identifier, a second unique identifier corresponding to the first device, and a key shared by the first device and the system;
generating, by the system, a third unique identifier comprising a payment amount corresponding to the transaction using the key shared by the first device and the system;
broadcasting, by the system, the third unique identifier to the first device during the transaction; and
causing to be processed, by the payment server, the transaction corresponding to the first account and an account corresponding to the first device.

2. The system of claim 1, wherein the information corresponding to the first device includes an address, an email address, or a phone number of a user of the first device.

3. The system of claim 1, wherein the information corresponding to the first device includes a preferred payment method of a user of the first device.

4. The system of claim 1, wherein the broadcasting is enabled based on the payment server verifying that the system corresponds to the first account.

5. The system of claim 1, wherein the first device corresponds to a second account associated with the payment server.

6. The system of claim 1, the operations further comprising transmitting an additional message to the payment server, wherein the additional message includes the payment amount corresponding to the transaction and the altered first unique identifier.

7. The system of claim 1, wherein the broadcasting causes a user interface of the first device to display a selectable element corresponding to an initiation of the transaction.

8. A method comprising:
transmitting, to a payment server from a merchant device, a request to register for a first account;
receiving, from the payment server, a first unique identifier, wherein the first unique identifier is generated by the payment server and corresponds to the payment server;
in response to the receiving, altering, by the merchant device, the first unique identifier based on a transaction received through the merchant device;
broadcasting, by the merchant device, a message to one or more devices that are located within a threshold distance of the merchant device, wherein the message includes the altered first unique identifier;
determining, by the merchant device via the payment server, that at least one of the one or more devices received the broadcasted message;
providing, by the merchant device through the at least one of the one or more devices, at least one of an audio indication or a video indication that transactions are available to be processed with the merchant device;
receiving, from the payment server, information corresponding to a first device of the one or more devices, wherein the information includes the altered first unique identifier, a second unique identifier corresponding to the first device, and a key shared by the first device and the merchant device;
generating, by the merchant device, a third unique identifier comprising a payment amount corresponding to the transaction using the key shared by the first device and the merchant device;
broadcasting, by the merchant device, the third unique identifier to the first device during the transaction; and causing to be processed, by the payment server, the transaction corresponding to the first account and an account corresponding to the first device.

9. The method of claim 8, wherein the information corresponding to the first device includes an address, an email address, or a phone number of a user of the first device.

10. The method of claim 8, wherein the information corresponding to the first device includes a preferred payment method of a user of the first device.

11. The method of claim 8, wherein the broadcasting is enabled based on the payment server verifying that the merchant device corresponds to the first account.

12. The method of claim 8, wherein the first device corresponds to a second account associated with the payment server.

13. The method of claim 8, further comprising transmitting an additional message to the payment server, wherein the additional message includes the payment amount corresponding to the transaction and the altered first unique identifier.

14. The method of claim 8, wherein the broadcasting causes a user interface of the first device to display a selectable element corresponding to an initiation of the transaction.

15. A computer program product comprising:
one or more computer-readable tangible storage devices, and program instructions stored on at least one of the one or more computer-readable tangible storage devices, the program instructions when executed cause a machine to perform operations comprising:
transmitting, to a payment server, a request to register for a first account;
receiving, from the payment server, a first unique identifier, wherein the first unique identifier is generated by the payment server and corresponds to the payment server;
in response to the receiving, altering the first unique identifier based on a transaction received through the machine;
broadcasting a message to one or more devices that are located within a threshold distance of the machine, wherein the message includes the altered first unique identifier;
determining, via the payment server, that at least one of the one or more devices received the broadcasted message;
providing, through the at least one of the one or more devices, at least one of an audio indication or a video indication that transactions are available to be processed with the machine;
receiving, from the payment server, information corresponding to a first device of the one or more devices, wherein the information includes the altered first unique identifier, a second unique identifier corresponding to the first device, and a key shared by the first device and the machine;
generating, by the machine, a third unique identifier comprising a payment amount corresponding to the transaction using the key shared by the first device and the machine;
broadcasting, by the machine, the third unique identifier to the first device during the transaction; and
causing to be processed, by the payment server, the transaction corresponding to the first account and an account corresponding to the first device.

16. The computer program product of claim 15, wherein the information corresponding to the first device includes personal information of a user of the first device and a preferred payment method of the user of the first device.

17. The computer program product of claim 15, wherein the broadcasting is enabled based on the payment server verifying that the machine corresponds to the first account.

18. The computer program product of claim 15, wherein the first device corresponds to a second account associated with the payment server.

19. The computer program product of claim 15, the operations further comprising transmitting an additional message to the payment server, wherein the additional message includes the payment amount corresponding to the transaction and the altered first unique identifier.

20. The computer program product of claim 15, wherein the broadcasting causes a user interface of the first device to display a selectable element corresponding to an initiation of the transaction.

* * * * *